United States Patent
Kuo et al.

(10) Patent No.: US 12,327,366 B2
(45) Date of Patent: Jun. 10, 2025

(54) DEEP LEARNING MODEL FOR HIGH RESOLUTION PREDICTIONS

(71) Applicant: QUALCOMM Incorporated, San Diego, CA (US)

(72) Inventors: Chieh-Ming Kuo, Taoyuan (TW); Michel Adib Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/934,527

(22) Filed: Sep. 22, 2022

(65) Prior Publication Data

US 2024/0112358 A1  Apr. 4, 2024

(51) Int. Cl.
*G06T 7/00* (2017.01)
*G06T 7/50* (2017.01)

(52) U.S. Cl.
CPC ...... *G06T 7/50* (2017.01); *G06T 2207/20081* (2013.01); *G06T 2207/20084* (2013.01)

(58) Field of Classification Search
CPC .......... G06T 7/50; G06T 2207/20081; G06T 2207/20084; G06N 3/0495; G06N 3/09
See application file for complete search history.

(56) References Cited

U.S. PATENT DOCUMENTS

| 10,949,736 B2 | 3/2021 | Deisher et al. |
| 2022/0284613 A1* | 9/2022 | Yin ............................ G06T 7/30 |

FOREIGN PATENT DOCUMENTS

| GB | 2601073 A * | 5/2022 | ............. G06N 3/063 |

OTHER PUBLICATIONS

International Search Report and Written Opinion—PCT/US2023/070695—ISA/EPO—Oct. 27, 2023.

* cited by examiner

*Primary Examiner* — Ping Y Hsieh
(74) *Attorney, Agent, or Firm* — Polsinelli LLP

(57) ABSTRACT

Systems and techniques are provided for deep learning model optimizations. An example process can include generating, based on processing data using a neural network model, a plurality of prediction outputs associated with a plurality of output channels corresponding to a multi-channel prediction target; determining that a prediction output from the plurality of prediction outputs has a value that is outside of a quantization range and one or more remaining prediction outputs from the plurality of prediction outputs have a respective value that is within the quantization range; clamping the prediction output based on the quantization range; and generating a single channel output based on the clamped prediction output and the one or more remaining prediction outputs.

28 Claims, 8 Drawing Sheets

| Target Value | Value in Ch0 | Value in Ch1 | Value in Ch2 | Value in Ch3 | Value in Ch4 | Value in Ch5 | Value in Ch6 | Value in Ch7 |
|---|---|---|---|---|---|---|---|---|
| 0.125 | 1 | 0 | 0 | 0 | 0 | 0 | 0 | 0 |
| 0.5 | 1 | 1 | 1 | 1 | 0 | 0 | 0 | 0 |
| 0.7 | 1 | 1 | 1 | 1 | 1 | 0.6 | 0 | 0 |
| 0.8 | 1 | 1 | 1 | 1 | 1 | 1 | 0.4 | 0 |

FIG. 3

|   | Ch0 | Ch1 | Ch2 | Ch3 |
|---|---|---|---|---|
| Prediction | 1.1 | 0.99 | 0.1 | -0.1 |
| Ground Truth | 1 | 1 | 0 | 0 |

700

GENERATE, BASED ON PROCESSING DATA USING A NEURAL NETWORK MODEL, A PLURALITY OF PREDICTION OUTPUTS ASSOCIATED WITH A PLURALITY OF OUTPUT CHANNELS CORRESPONDING TO A MULTI-CHANNEL PREDICTION TARGET
702

DETERMINE THAT A PREDICTION OUTPUT FROM THE PLURALITY OF PREDICTION OUTPUTS HAS A VALUE THAT IS OUTSIDE OF A QUANTIZATION RANGE AND ONE OR MORE REMAINING PREDICTION OUTPUTS FROM THE PLURALITY OF PREDICTION OUTPUTS HAVE A RESPECTIVE VALUE THAT IS WITHIN THE QUANTIZATION RANGE
704

CLAMP THE PREDICTION OUTPUT BASED ON THE QUANTIZATION RANGE
706

GENERATE A SINGLE CHANNEL OUTPUT BASED ON THE CLAMPED PREDICTION OUTPUT AND THE ONE OR MORE REMAINING PREDICTION OUTPUTS
708

FIG. 7

DEEP LEARNING MODEL FOR HIGH RESOLUTION PREDICTIONS

TECHNICAL FIELD

The present disclosure generally relates to neural network models. For example, aspects of the present disclosure relate to systems and techniques for a deep learning model for high resolution predictions.

BACKGROUND

Deep learning models can be used to perform a variety of tasks such as detection and/or recognition (e.g., scene or object detection and/or recognition), depth estimation, pose estimation, image reconstruction, classification, three-dimensional (3D) modeling, dense regression tasks, data compression and/or decompression, image processing, among other tasks. Deep learning models can be versatile and can achieve high quality results in a variety of tasks. However, while deep learning models can be versatile and accurate, the models are often large and slow, and generally have high memory demands and computational costs. In many cases, the computational complexity of the models can be high and the models can be difficult to train.

SUMMARY

Systems and techniques are described herein that provide a deep learning model (e.g., with an ordered multi-channel output arrangement) for high resolution predictions. In one illustrative example, a process for wireless communications at a user equipment (UE) is provided.

According to at least one example, a method is provided for implementing a deep learning model. The processor-implemented method includes: generating, based on processing data using a neural network model, a plurality of prediction outputs associated with a plurality of output channels corresponding to a multi-channel prediction target; determining that a prediction output from the plurality of prediction outputs has a value that is outside of a quantization range and one or more remaining prediction outputs from the plurality of prediction outputs have a respective value that is within the quantization range; clamping the prediction output based on the quantization range; and generating a single channel output based on the clamped prediction output and the one or more remaining prediction outputs.

In another example, an apparatus for implementing a deep learning model is provided that includes at least one memory and at least one processor coupled to the at least one memory. The at least one processor is configured to: generate, based on processing data using a neural network model, a plurality of prediction outputs associated with a plurality of output channels corresponding to a multi-channel prediction target; determine that a prediction output from the plurality of prediction outputs has a value that is outside of a quantization range and one or more remaining prediction outputs from the plurality of prediction outputs have a respective value that is within the quantization range; clamp the prediction output based on the quantization range; and generate a single channel output based on the clamped prediction output and the one or more remaining prediction outputs.

In another example, a non-transitory computer-readable medium is provided that has stored thereon instructions that, when executed by one or more processors, cause the one or more processors to: generate, based on processing data using a neural network model, a plurality of prediction outputs associated with a plurality of output channels corresponding to a multi-channel prediction target; determine that a prediction output from the plurality of prediction outputs has a value that is outside of a quantization range and one or more remaining prediction outputs from the plurality of prediction outputs have a respective value that is within the quantization range; clamp the prediction output based on the quantization range; and generate a single channel output based on the clamped prediction output and the one or more remaining prediction outputs.

In another example, an apparatus for implementing a deep learning model is provided. The apparatus includes: means for generating, based on processing data using a neural network model, a plurality of prediction outputs associated with a plurality of output channels corresponding to a multi-channel prediction target; means for determining that a prediction output from the plurality of prediction outputs has a value that is outside of a quantization range and one or more remaining prediction outputs from the plurality of prediction outputs have a respective value that is within the quantization range; means for clamping the prediction output based on the quantization range; and means for generating a single channel output based on the clamped prediction output and the one or more remaining prediction outputs.

In some aspects, an apparatus can be, or can be part of, a mobile device (e.g., a mobile telephone or so-called "smartphone," or other mobile device), a camera (e.g., a digital camera, an Internet Protocol (IP) camera, a camera of a mobile device), a smart wearable device, an extended reality device (e.g., a virtual reality (VR) device, an augmented reality (AR) device, or a mixed reality (MR) device), a personal computer, a laptop computer, a multi-camera system, a vehicle or a computing device or system of a vehicle, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 3 is a table illustrating example multi-channel outputs derived from target outputs in a deep learning model, in accordance with some examples of the present disclosure;

FIG. 7 is a flowchart illustrating an example process for optimizing a deep learning model, in accordance with some examples of the present disclosure.

DETAILED DESCRIPTION

Figure 1:
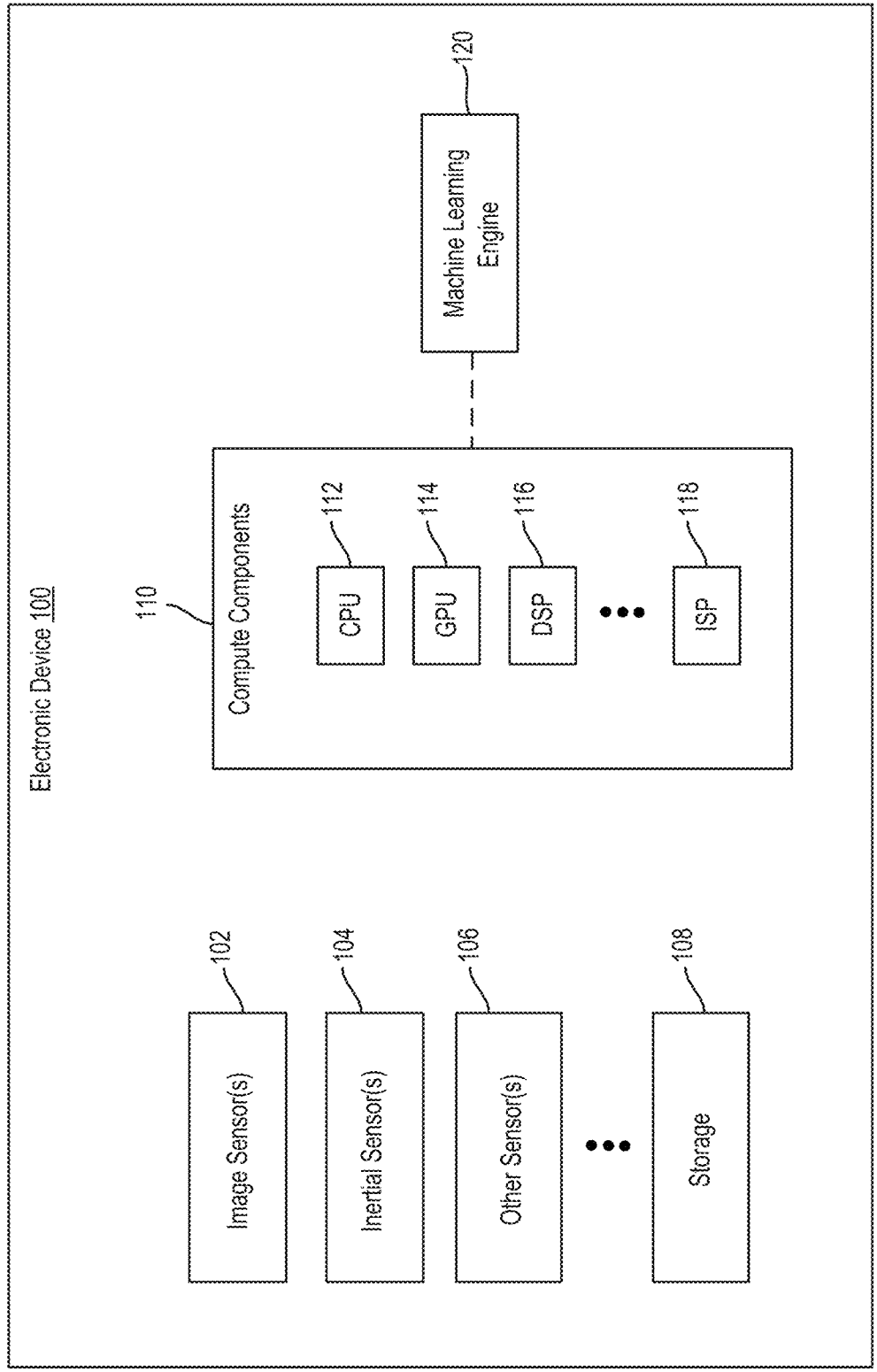
FIG. 1 is a simplified block diagram illustrating an example electronic device, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

As noted above, deep learning models can be used to perform a variety of tasks such as, for example and without limitation, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. Moreover, deep learning models can be versatile and can achieve high quality results in a variety of tasks. However, while deep learning models can be versatile and accurate, the models are often large, slow, and generally have high memory demands and computational costs. In many cases, the computational complexity of the models can be high and the models can be difficult to train.

In some cases, 8-bit quantization can be used for deep learning model optimization. For example, the 8-bit quantization can be used to quantize the weights and/or parameters (e.g., feature maps, etc.) of the deep learning model in order to reduce the size and inference times of the model. However, the prediction resolution of deep learning models optimized through 8-bit quantization is often insufficient for dense regression tasks such as, for example and without limitation, depth estimation, pose estimation, etc. For example, the prediction resolution (e.g., the resolution of the prediction values or feature maps) of the deep learning model optimized through 8-bit quantization can be limited to 256 values, which can be too low for dense regression tasks. In some cases, a deep learning model can be optimized by using two 8 bits numbers to represent a 16-bit number. In such cases, one of the 8-bit numbers can be used for higher bits and the other 8-bit number can be used for lower bits.

In some cases, this approach can result in a discontinuous behavior on the lower bits for a carry (which can be difficult to model by the deep learning model), can conflict with the deep learning model's inference (e.g., the model may have difficulty following such a pattern during prediction), and can increase the difficulty of training the model. For example, when using two 8-bit numbers to represent a 16-bit number, the values associated with the lower bits (e.g., the values in the vector corresponding to the 8-bit number used for the lower bits) can change from zero to its maximum value and quickly drop back to zero (and, at certain points, the target value associated with the lower bits can be very close to the target value associated with the higher bits). The maximum value associated with the lower bits does not always increase or continue to increase as the target values associated with the lower bits increase. Such discontinuous behavior is difficult to achieve by the deep learning model during inference.

Systems, apparatuses, processes (also referred to as methods), and computer-readable media (collectively referred to as "systems and techniques") are described herein for deep learning model optimizations (e.g., optimization of a neural network or multiple neural networks). In some examples, the systems and techniques described herein can implement an ordered multi-channel output arrangement (e.g., a number of channels into which a plurality of outputs, such as prediction outputs, can be distributed) for deep learning model optimization. The multi-channel outputs can be used to optimize a deep learning model (e.g., one or more neural networks). For instance, each multi-channel output can include a vector of values generated based on a number of channels and a target output associated with the multi-channel output. The values included in the vector of values can be distributed across the different channels associated with the multi-channel output.

In some cases, the systems and techniques described herein can implement an 8-bit quantization deep learning model with an ordered multi-channel output arrangement. The ordered multi-channel output arrangement can increase the output resolution of the 8-bit quantization model with the deep learning model trained on floating numbers. During model training, the ground truth predictions can be decomposed into multi-channel representations used to determine supervised losses. A clamped integration can then be used to recover a high precision output.

For example, during model training, the model predictions (e.g., the multi-channel outputs) can be quantized and compared with quantized ground truth predictions to determine supervised losses. The quantized model predictions can be clamped to prevent the quantized prediction values from falling outside of a quantization range. In some cases, there may not be any additional gradient when a quantized prediction value is outside of the quantization range, so the quantized prediction value can be clamped to ensure the quantized prediction value is within the quantization range and to improve the performance of the model. The clamped values can then be compared with the quantized ground truth predictions to determine supervised losses for the clamped values. The supervised losses can be used to train the deep learning model, and the clamped values can be used to recover a high precision and/or resolution output for a single channel.

In some cases, the systems and techniques described herein can use Equation 1 below to perform the clamped integration for each number (e.g., each prediction from the multi-channel outputs):

$$v_{out} = \frac{1}{N}\sum_{1}^{N}\max(\min(v_i, 1), 0) \quad \text{Equation (1)}$$

where $v_i$ is the value for channel i, and N is the number of channels. In some aspects, the ordered multi-channel output arrangement described herein can split or decompose each target output from the deep learning model, which can be a floating number, into multiple 8-bit numbers. In some examples, the multiple 8-bit numbers can represent the floating number output. The target output can be distributed to each channel from 0 to 1 with a small to large order.

Examples of the systems and techniques described herein for processing data are illustrated in FIG. 1 through FIG. 8 and described below.

FIG. 1 is a diagram illustrating an example electronic device 100, in accordance with some examples of the disclosure. The electronic device 100 can implement the systems and techniques disclosed herein. For example, the electronic device 100 can perform the deep learning model training and optimization systems and techniques described herein. The electronic device 100 can perform various tasks and operations such as, for example and without limitation, extended reality tasks and operations (e.g., tracking, mapping, localization, content rendering, pose estimation, object detection/recognition, etc.), image/video processing and/or post-processing, data processing and/or post-processing, computer graphics, machine vision, depth estimation, neural network model training, neural network model optimization, object modeling, multimedia rendering and/or composition, object detection, object recognition, localization, scene recognition, and/or any other data processing tasks, effects, and/or computations.

In some examples, the electronic device 100 can perform supervised training for a deep learning model. The deep learning model can be configured to perform one or more tasks such as, for example and without limitation, dense regression tasks (e.g., depth estimation, pose estimation, etc.). The deep learning model can be based on a model architecture such as, for example, a convolutional neural network (CNN) architecture, a recurrent neural network (RNN) model architecture, and/or any other neural network architecture. In some examples, the electronic device 100 can optimize a deep learning model as further described herein. For example, in some cases, the electronic device 100 can optimize a deep learning model by implementing an ordered multi-channel output arrangement as further described herein.

In the example shown in FIG. 1, the electronic device 100 includes one or more image sensors 102, one or more inertial sensors 104 (e.g., one or more inertial measurement units), one or more other sensors 106 (e.g., one or more radio detection and ranging (radar) sensors, light detection and ranging (LIDAR) sensors, acoustic/sound sensors, infrared (IR) sensors, magnetometers, touch sensors, laser rangefinders, light sensors, proximity sensors, motion sensors, active pixel sensors, machine vision sensors, ultrasonic sensors, etc.), storage 108, compute components 110, and a machine learning engine 120. In some cases, the electronic device 100 can include additional software and/or software engines such as, for example, an extended reality (e.g., virtual reality, augmented reality, mixed reality, etc.) engine, an image processing engine, a rendering engine, a depth estimation engine, a pose estimation engine, etc.

The components 102 through 120 shown in FIG. 1 are non-limiting examples provided for illustration and explanation purposes. In other examples, the electronic device 100 can include more, less, and/or different components than those shown in FIG. 1. For example, in some cases, the electronic device 100 can include one or more display devices, one more other processing engines, one or more receivers (e.g., global positioning systems, global navigation satellite systems, etc.), one or more communications devices (e.g., radio frequency (RF) interfaces and/or any other wireless/wired communications receivers/transmitters), one or more other hardware components, and/or one or more other software and/or hardware components that are not shown in FIG. 1. An example architecture and example hardware components that can be implemented by the electronic device 100 are further described below with respect to FIG. 8.

The one or more image sensors 102 in FIG. 1 can include any number of image sensors. For example, in some cases, the one or more image sensors 102 can include a single image sensor. In other cases, the one or more image sensors 102 can include two image sensors in a dual-camera implementation or more than two image sensors in other, multi-camera implementations. The electronic device 100 can be part of, or implemented by, a single computing device or multiple computing devices. In some examples, the electronic device 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, etc.), or any other suitable electronic device(s).

In some implementations, the one or more image sensors 102, one or more inertial sensor(s) 104, the other sensor(s) 106, storage 108, compute components 110, and machine learning engine 120 can be part of the same computing device. For example, in some cases, the one or more image sensors 102, one or more inertial sensor(s) 104, one or more other sensor(s) 106, storage 108, compute components 110, and machine learning engine 120 can be integrated into a smartphone, laptop, tablet computer, smart wearable device, game console, an advanced driver-assistance system (ADAS) of a vehicle, a server, a smart television, a camera system, and/or any other computing device. In other implementations, the one or more image sensors 102, one or more inertial sensor(s) 104, the other sensor(s) 106, storage 108, compute components 110, and machine learning engine 120 can be part of two or more separate computing devices. For example, in some cases, some of the components 102 through 120 can be part of, or implemented by, one computing device and the remaining components can be part of, or implemented by, one or more other computing devices.

The one or more image sensors 102 can include any image and/or video sensor or capture device, such as a digital camera sensor, a video camera sensor, a smartphone camera sensor, an image/video capture device on an electronic apparatus such as a television or computer, a camera, etc. In some cases, the one or more image sensors 102 can be part of a multi-camera system or a computing device such as an extended reality (XR) device (e.g., an HMD, smart glasses, etc.), a digital camera system, a smartphone, a smart television, a game console, etc. The one or more image sensors 102 can capture image and/or video content (e.g., raw image and/or video data), which can be processed by the compute components 110.

In some examples, the one or more image sensors 102 can capture image data and generate frames based on the image data and/or provide the image data or frames to the compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

The electronic device 100 can optionally include one or more inertial sensors 104. The one or more inertial sensors 104 can detect a specific force and angular rate of the electronic device 100. In some cases, the one or more inertial sensors 104 can detect an orientation of the electronic device 100. The one or more inertial sensors 104 can generate linear acceleration measurements, rotational rate measurements, and/or heading measurements. In some examples, the one or more inertial sensors 104 can be used to measure the pitch, roll, and yaw of the electronic device 100.

The electronic device 100 can optionally include one or more other sensor(s) 106. In some examples, the one or more other sensor(s) 106 can detect and generate other measurements used by the electronic device 100. In some cases, the compute components 110 can use data and/or measurements from the one or more image sensors 102, the one or more inertial sensors 104, and/or the one or more other sensor(s) 106 to perform various tasks such as, for example and without limitation, localizing the electronic device 100 in three-dimensional (3D) space, tracking a pose of the electronic device 100, etc. In other examples, the electronic device 100 can also include other sensors, such as a magnetometer, an acoustic/sound sensor, an IR sensor, a machine vision sensor, a smart scene sensor, a radar sensor, a LIDAR sensor, a light sensor, etc.

The storage 108 can be any storage device(s) for storing data. Moreover, the storage 108 can store data from any of the components of the electronic device 100. For example, the storage 108 can store data from the one or more image sensors 102 (e.g., image or video data), data from the one or more inertial sensors 104 (e.g., measurements), data from the one or more other sensors 106 (e.g., measurements), data from the compute components 110 (e.g., processing parameters, timestamps, preferences, virtual content, rendering content, scene maps, tracking and localization data, object detection data, configurations, XR application data, recognition data, synchronization data, outputs, a deep learning model and/or associated data and/or parameters, etc.), and/or data from the machine learning engine 120. In some examples, the storage 108 can include a buffer for storing frames and/or other camera data for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, computer vision, depth estimation, pose estimation, graphics rendering, extended reality (e.g., tracking, localization, pose estimation, mapping, content anchoring, content rendering, etc.), image/video processing, sensor processing, detection (e.g., face detection, object detection, feature detection, pattern detection, scene detection or scene change detection, occlusion detection, etc.), recognition (e.g., text recognition, facial recognition, object recognition, feature recognition, pattern recognition, scene recognition, occlusion detection, etc.), machine learning, filtering, object detection, and any of the various operations described herein.

In the example shown in FIG. 1, the compute components 110 can implement the machine learning engine 120. For example, the operations for the machine learning engine 120 can be implemented by any of the compute components 110. The machine learning engine 120 can include one or more neural network models, such as a deep learning model such as the supervised deep learning model described herein. In some examples, the compute components 110 can also implement one or more other processing engines.

While the electronic device 100 is shown to include certain components, one of ordinary skill will appreciate that the electronic device 100 can include more or fewer components than those shown in FIG. 1. For example, the electronic device 100 can also include, in some instances, one or more memory devices (e.g., RAM, ROM, cache, and/or the like), one or more network interfaces (e.g., wired and/or wireless communications interfaces and the like), one or more display devices, and/or other hardware or processing devices that are not shown in FIG. 1. An illustrative example of a computing device and hardware components that can be implemented with the electronic device 100 is described below with respect to FIG. 8.

Moreover, references to any of the components of the electronic device 100 in the singular should not be interpreted as limiting the number of such components implemented by the electronic device 100 to one. For example, references to a processor in the singular form should not be interpreted as limiting the number of processors implemented by the electronic device 100 to one. Similarly, references to an image sensor or a camera in the singular form should not be interpreted as limiting the number of image sensors or cameras implemented by the electronic device 100 to one.

Figure 2:
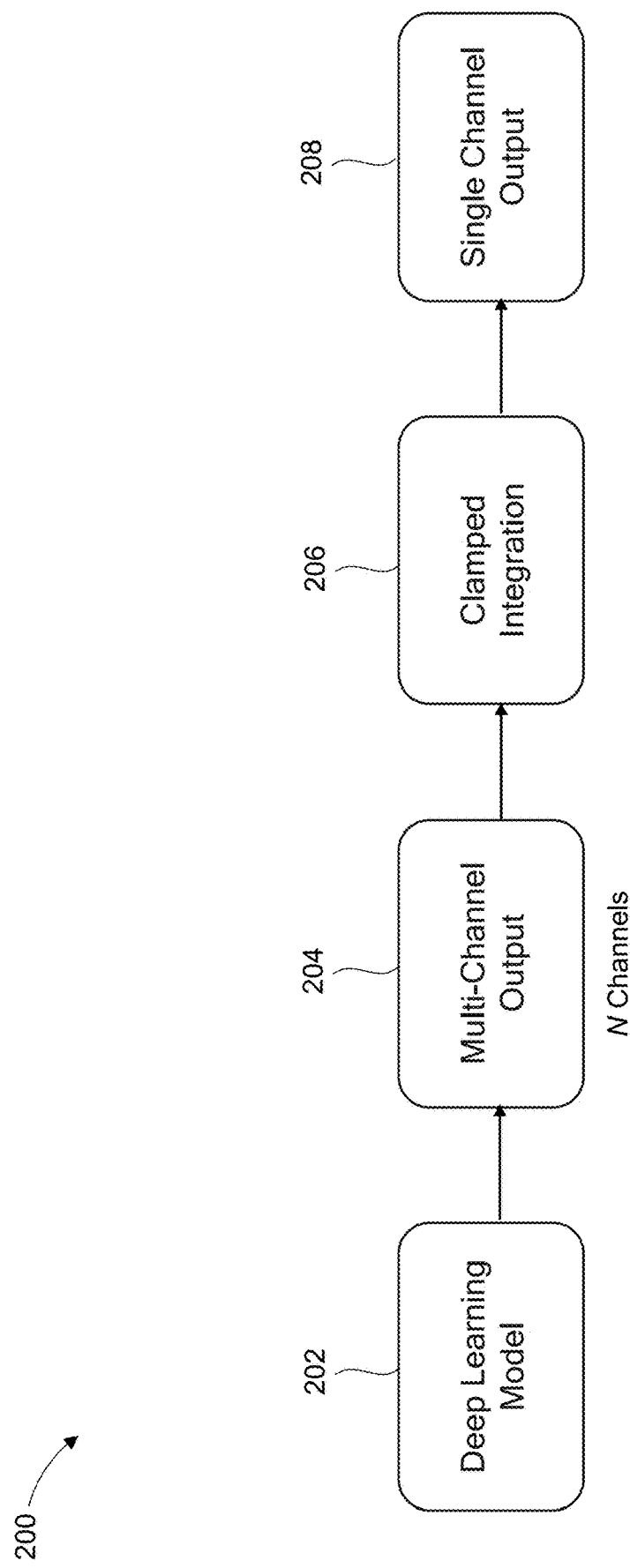
FIG. 2 is a flowchart illustrating an example process for optimizing a deep learning model, in accordance with some examples of the present disclosure.

FIG. 2 is a flowchart illustrating an example process 200 for optimizing a deep learning model. In this example, the process 200 can be used to implement a quantized model that performs higher precision and/or resolution predictions. For example, the process 200 can implement an 8-bit quantized deep learning model with an ordered, multi-channel output arrangement, that achieves prediction results that have a higher resolution than other 8-bit quantized deep learning models.

At block 204, the electronic device 100 can decompose each target output from a deep learning model 202 into multi-channel outputs. In one illustrative example, the deep learning model 202 can include a neural network or multiple neural networks (e.g., a CNN, an RNN, or other type of neural network). In some examples, each multi-channel output can include N channels. The N channels can include two or more channels. For example, in some cases, the N channels can include 8 channels. In some examples, each target output can include a floating number. In some cases, the electronic device 100 can decompose each target output from the deep learning model 202 into multiple 8-bit numbers.

At block 206, the electronic device 100 can apply a clamped integration to each output/prediction from the multi-channel outputs. In some examples, the electronic device 100 can use Equation 1 described above to perform the clamped integration. For example, in some cases, the electronic device 100 can perform the clamped integration for each output from the multi-channel outputs as follows:

$$v_{out} = \frac{1}{N}\sum_{1}^{N} \max(\min(v_i, 1), 0),$$

where $v_i$ is the value for channel i, and N is the number of channels.

At block 208, the electronic device 100 can recover a single channel output based on the clamped integration. For example, the electronic device 100 can use the clamped integration to ensure that the output values from the multi-channel outputs are within a quantization range. Here, if an output value from the multi-channel outputs is outside of the quantization range, then the electronic device 100 can clamp the output value so it falls within the quantization range. To illustrate, if the quantization range is from 0 to 1 and an output value is 1.1, then the clamped integration can reduce the output value to 1 so it falls within the 0 to 1 range. Similarly, if the quantization range is from 0 to 1 and an output value is −0.1, then the clamped integration can adjust the output value to 0 so it falls within the 0 to 1 range.

The single channel output can include a single channel representation of the multi-channel outputs. The single channel output can provide a higher precision and/or resolution than a single channel output derived from an 8-bit quantized deep learning model that does not implement multi-channel outputs as described herein. In some examples, the electronic device 100 can use the clamped integration to recover the single channel representation of the multi-channel outputs. For example, in some cases, the electronic device 100 can use the clamped outputs derived during the clamped integration to generate the single channel representation of the multi-channel outputs. In some examples, the electronic device 100 can determine the single channel representation of the multi-channel outputs based on an average or a mean of the clamped outputs derived from the multi-channel outputs using the clamped integration.

FIG. 3 is a table illustrating example multi-channel outputs derived from target outputs (e.g., a plurality of prediction outputs) in a deep learning model, such as deep learning model 202 shown in FIG. 2. The multi-channel outputs can be used to optimize the deep learning model as further described herein. In some examples, each multi-channel output can include a vector of values generated based on the number of channels and the target output associated with the multi-channel output as further explained below. The values in the vector of values can be distributed across the different channels (e.g., channels 304-318) associated with the multi-channel output. The vector of values can include a predicted vector that can be used to recover the target value used to generate the vector of values. For example, the values in the vector of values can be added and divided by the number of channels to recover the target value associated with the vector of values.

The vector of values can be determined by multiplying the target value associated with the vector of values and dividing the result by the number of channels to determine a multi-channel target distribution number. In some examples, the multi-channel target distribution number can include a floating-point number. In some cases, if the multichannel target distribution number is a whole number, then the vector of values can be determined by splitting the multi-channel target distribution number into a vector of binary digits that, when added, the addition result is equal to the multi-channel target distribution number. The number of binary digits in the vector of values can equal to the number of channels determined for the multi-channel output. Moreover, the sequence of distribution of the binary digits across the channels can include binary digits having a "1" value followed by binary digits having a "0" value. For example, if the multi-channel target distribution number equals 5 and the number of channels is 8, then the vector of values can include the following sequence of binary digits: 1, 1, 1, 1, 1, 0, 0, and 0. As shown in this example, the combination of the binary digits equals 5 (e.g., 1+1+1+1+1+0+0+0=5), and the sequence of the binary digits starts with "1" values followed by "0" values.

If the multi-channel target distribution number used to generate the vector of values is not a whole number, the vector of values can be determined by splitting the multi-channel target distribution number into a vector that includes one or more binary digits corresponding to the whole number part of the multi-channel target distribution number and a floating-point number corresponding to the fractional part of the multi-channel target distribution number. Moreover, the sum of the binary digits and the floating-point number in the vector of values can be equal to the multi-channel target distribution number. For example, if the multi-channel target distribution number equals 6.4 and the number of channels is 8, then the vector of values can include the following sequence of values including the binary digits and the floating point number: 1, 1, 1, 1, 1, 1, 0.4, and 0. As shown in this example, the combination of the binary digits and the floating point number equals 6.4 (e.g., 1+1+1+1+1+1+0.4+0=6.4). The sequence of values starts with any "1" values, followed the floating-point number "0.4", and followed by any decimal digits floating point numbers "0" values.

The sequence of values can be distributed across the channels such that the binary digits having a "1" value are distributed to the first channel(s), followed by any binary digits having a "0" value. Thus, if the number of channels is 8 and the sequence of values includes the binary digits 1, 1, 1, 1, 1, 0, 0, and 0, then the binary digits with the "1" value can be distributed to the first five channels and the remaining binary digits with the "0" value can be distributed to the last channels remaining. If the sequence of values includes a floating-point number, then the sequence of values can be distributed across the channels such that the binary digits having a "1" value are distributed to the first channel(s), the floating point number is distributed to the following channel, and the binary digits having a "0" value are distributed to the remaining channels, if any. Therefore, in the previous example where the multi-channel target distribution channel equals 6.4, the first six channels are associated with a binary value of "1", the seventh channel is associated with the "0.4" floating point number, and the last channel is associated with the binary value "0" in the sequence of values.

The multi-channel outputs can include n number of channels, where n represents an integer value of two or more. In the example shown in FIG. 3, each multi-channel output includes 8 channels so n represents a value of 8. Moreover, the table in FIG. 3 includes a target values column 302 which is a column of target values, and channel columns 304-318 representing columns of channel values. The channel values in the channel columns 304-218 can include quantized values from 0 to 1 for the different channels associated with the channel columns 304-318 and can be used to recover the target values in the target values column 302. The quantized values of each multi-channel output can be derived based on the number of channels associated with the multi-channel output and a respective target value in target values column 302. In the example shown in FIG. 3, the target values in the target values column 302 include values from 0 to 0.125, and the channel values include quantized values from 0 to 1. The quantized values of the channels associated with a particular target value from the target values column 302 represent the particular target value from the target values column 302 and can be used to recover the target values column 302.

As previously noted, the quantized values of the channels in the channel columns 304-318 can be determined by multiplying a respective target value by the number of channels, which in this example is 8. The result of multiplying the respective target value by the number of channels can represent a total multi-channel target value for the channels, which can be a whole number or a floating-point number. The total multi-channel target value for the channels can be used to determine the quantized values for the channels and a sequence of the quantized values for distribution across the channels.

If the total multi-channel target value is not a whole number (e.g., if the total multi-channel target value is a floating-point number), to determine the quantized values for the channels associated with a target value from the target values column 302, the total multi-channel target value can be split into binary digits and a floating point number. The binary digits and the floating-point number can represent the quantized values of the different channels for a target value and can include a value for each channel, and can add up to the total multi-channel target value. For example, if the total multi-channel target value is 6.4, then the quantized values can include 1, 1, 1, 1, 1, 1, 0.4, and 0. Here, the first six binary digits (e.g., 1, 1, 1, 1, 1, and 1) and the floating-point number (e.g., 0.4) represent and add up to the total multi-channel target value (e.g., 6.4). The remaining binary digit includes a value of 0 since the first six binary digits and the floating-point number, which is the seventh value, add up to the total multi-channel target value of 6.4. The values in the sequence of values including the binary digits and the floating point number (e.g., 1, 1, 1, 1, 1, 1, 0.4, and 0) can be distributed across the channels associated with the channel columns 304-318, with the binary digits that equal to 1 being distributed to the first channels until every binary digit that equals to 1 is assigned to a channel, the floating point number being distributed to the subsequent channel after the last channel associated with a binary digit value of 1, and the last binary digit, which equals to 0, being distributed to the remaining channel (e.g., the last channel).

If the total multi-channel target value is a whole number, to determine the quantized values for the channels, the total multi-channel target value can be split into binary digits. The binary digits can include a binary digit for each channel, and can add up to the total multi-channel target value. For example, if the total multi-channel target value is 5, then the binary digits can include 1, 1, 1, 1, 1, 0, 0, and 0. Here, the first five binary digits (e.g., 1, 1, 1, 1, and 1) represent and add up to the total multi-channel target value. The remaining binary digits include values of 0 since the first five binary digits add up to the total multi-channel target value of 5. The binary digits in the sequence of binary digits (e.g., 1, 1, 1, 1, 1, 0, 0, and 0) can be distributed across the channels associated with the channel columns 304-318, with the binary digits that equal to 1 being distributed to the first channels until every binary digit that equals to 1 is assigned to a channel, and the binary digits that equal to 0 being distributed to the remaining channels.

For example, the target value 320, which in the example shown in FIG. 3 is 0.125, is represented by the quantized channel value 1 in the channel associated with channel column 304 (e.g., the first channel or channel 0), and the quantized channel value 0 in the channels associated with the channels associated with channel column 306 (e.g., the second channel or channel 1), channel column 308 (e.g., the third channel or channel 2), channel column 310 (e.g., the fourth channel or channel 3), channel column 312 (e.g., the fifth channel or channel 4), channel column 314 (e.g., the sixth channel or channel 5), channel column 316 (e.g., the seventh or channel 6), and channel column 318 (e.g., the eight channel or channel 7). The quantized channel values 1, 0, 0, 0, 0, 0, 0, and 0 for the channels corresponding to the channel columns 304-318 can be determined based on the target value 320, which as noted above is 0.125 in this example, and the number of channels, which in this example is 8.

To illustrate, the quantized channel values 1, 0, 0, 0, 0, 0, 0, and 0 can be determined by multiplying the target value 0.125 by 8 channels, which equals 1. The result of multiplying the target value by the number of channels, which is 1 in this example, is itself a binary digit. Thus, to determine the quantized values for the channels associated with channel columns 304-318, the binary digit resulting from multiplying the target value by the number of channels is combined with seven binary digits having a value of 0 and corresponding to the remaining eight channels. The quantized channel values are then distributed across the respective eight channels in the channel columns 304-318 and associated with the target value 320, starting with the first channel (e.g., the channel associated with channel column 304). Each quantized value from the quantized channel values that equals to "1" is distributed first (e.g., across one or more respective channels associated with one or more of the channel columns 304-318). Each quantized value from the quantized channel values that equals to "0" is subsequently distributed (e.g., across one or more respective channels associated with one or more of the channel columns 304-318).

For example, the total multi-channel target value, which is the result of multiplying the target value 0.125 by 8 channels, can be split into binary digits with values of 1 and each binary digit with a value of 1 is then distributed across associated channels from the channel columns 304-318, starting with the first channel (e.g., the channel associated with channel column 304) until all the values of 1 have been distributed. Once all the values of 1 have been distributed, if there are any remaining channels without a value, then the remaining channels can be assigned a binary digit with a value of 0. If the result of multiplying the target value 0.125 by 8 channels (e.g., the total multi-channel target value) includes a floating-point number, then the fractional part of the floating point number is added to a subsequent channel after the last channel receiving a value of 1. Thus, since in this example the result of multiplying the target value 0.125 by 8 channels is 1, the first channel (e.g., the channel associated with channel column 304) includes the value of 1 and the remaining channels (e.g., the channels associated with channel columns 306-318) include a value of 0.

The target value 322, which in this example is 0.7, is represented by the value 1 in the first channel (e.g., channel 0 associated with channel column 304) (e.g., channel 0), the value 1 in the second channel (e.g., channel 1 associated with channel column 306, the value 1 in the third channel (e.g., channel 2 associated with channel column 308), value 1 in the fourth channel (e.g., channel 3 associated with channel column 310), the value 0 in the fifth channel (e.g., channel 4 associated with channel column 312), the value 0 in the sixth channel (e.g., channel 5 associated with channel column 314), the value 0 in the seventh channel (e.g., channel 6 associated with channel column 316), and the value 0 in the eight channel (e.g., channel 7 associated with channel column 318). The values 1, 1, 1, 1, 0, 0, 0, and 0 for the channels corresponding to channel columns 304-318 can be determined based on the target value 322 (e.g., 0.5) and the number of channels, which in this example is 8. For example, the values 1, 1, 1, 1, 0, 0, 0, and 0 can be determined by multiplying the target value 0.5 by 8 channels, which equals 4. The result of multiplying the target value 0.5 by 8 channels is split into binary digits which equal to the result of multiplying the target value 0.5 by 8 channels. The binary digits are then distributed across the 8 channels starting with the first channel (e.g., the channel 0 associated with channel column 304).

As previously explained, the result of multiplying the target value 0.5 by 8 channels is split into binary digits with values of 1 and each value of 1 is then distributed across the channels 304-318, starting with the first channel (e.g., the channel associated with channel column 304) until there are no more values of 1. If the result of multiplying the target value 0.5 by 8 channels includes a floating point number, then the fractional part of the floating point number is associated with the subsequent channel after the last channel that received a value of 1. Thus, since in this example the result of multiplying the target value 0.5 by 8 channels is 4, the first four channels (e.g., the channels associated with channel columns 304-310) include the value 1, which results in four values of 1 totaling 4 (e.g., totaling the result of multiplying the target value by the number of channels). Thus the remaining channels (e.g., the channels associated with channel columns 312-318) include the value 0.

The target value 324, which in this example is 0.5, is represented by a binary digit with a value of value of 1 in the first channel (e.g., channel 0 associated with channel column 304), a binary digit with a value of 1 in the second channel (e.g., channel 1 associated with channel column 306), a binary digit with a value of 1 in the third channel (e.g., channel 2 associated with channel column 308), a binary digit with a value of 1 in the fourth channel (e.g., channel 3 associated with channel column 310), a binary digit with a value of 1 in the fifth channel (e.g., channel 4 associated with channel column 312), a floating point number with a value of 0.6 in the sixth channel (e.g., channel 5 associated with channel column 314), a binary digit with a value of 0 in the seventh channel (e.g., channel 6 associated with channel column 316), and a binary digit with a value of 0 in the eight channel (e.g., channel 7 associated with channel column 318). The values 1, 1, 1, 1, 1, 0.6, 0, and 0 for the channels associated with channel columns 304-318 can be determined based on the target value 324 (e.g., 0.7) and the number of channels, which in this example is 8. For example, the sequence of quantized target values 1, 1, 1, 1, 1, 0.6, 0, and 0 can be determined by multiplying the target value 0.7 by 8 channels, which equals 5.6, and splitting the value 5.6 into five binary digits with a value of 1, a floating point number with a value of 0.6, and two binary digits with a value of 0. The sequence of quantized target values is then distributed across the 8 channels starting with the first channel (e.g., the channel associated with channel column 304) until the last channel (e.g., the channel associated with channel column 318).

To illustrate, the result of multiplying the target value 0.7 by 8 channels (e.g., 5.6) is split into five binary digits with each binary digit having a value of 1 and each value of 1 is then distributed across the first five channels (e.g., the channels associated with channel columns 304-312) until there are no more values of 1. Since in this example the result of multiplying the target value 0.7 by 8 channels includes a floating point number (e.g., 5.6), then the fractional part of the floating point number (e.g., 0.6) is added in the subsequent channel after the last channel receiving a value of 1 (e.g., the channel associated with channel column 314). Thus, since in this example the result of multiplying the target value 0.7 by 8 channels is 5.6, the first five channels (e.g., the channel 0-4 associated with the channel columns 304-312) include the value 1 which together add up to 5. The remaining 0.6 value from the 5.6 result is then added to the next channel, which in this example is the channel associated with channel column 314, and a binary digit with a value of 0 is then added to the remaining channels, which in this example include the channels associated with channel columns 316-318.

The target value 326, which in this example is 0.8, is represented by a binary digit with a value of 1 in the first channel (e.g., channel 0 associated with channel column 304), a binary digit with a value of 1 in the second channel (e.g., channel 1 associated with channel column 306), a binary digit with a value of 1 in the third channel (e.g., channel 2 associated with channel column 308), a binary digit with a value of 1 in the fourth channel (e.g., channel 3 associated with channel column 310), a binary digit with a value of 1 in the fifth channel (e.g., channel 4 associated with channel column 312), a binary digit with a value of 1 in the sixth channel (e.g., channel 5 associated with channel column 314), a floating number with a value of 0.4 in the seventh channel (e.g., channel 6 associated with channel column 316), and a binary digit with a value of 0 in the eight channel (e.g., channel 7 associated with channel column 318). The sequence of quantized target values 1, 1, 1, 1, 1, 1, 0.4, and 0 for the channels associated with channel columns 304-318 can be determined based on the target value 326 (e.g., 0.8) and the number of channels (e.g., 8). For example, the sequence of quantized target values 1, 1, 1, 1, 1, 1, 0.4, and 0 can be determined by multiplying the target value 0.8 by 8 channels, which equals 6.4, and splitting the resulting value of 6.4 into six binary digits with a value of 1, which equals to 6, a floating point number with a value of 0.6, and two binary digits with a value of 0. Together, the six binary digits with the value of 1, the floating point number with the value of 0.4, and the two binary digits with a value of 0 equal 6.4. The sequence of quantized target values is then distributed across the 8 channels starting with the first channel (e.g., channel 0 associated with channel column 304) until the last channel (e.g., channel 7 associated with channel column 318).

Figure 4A:
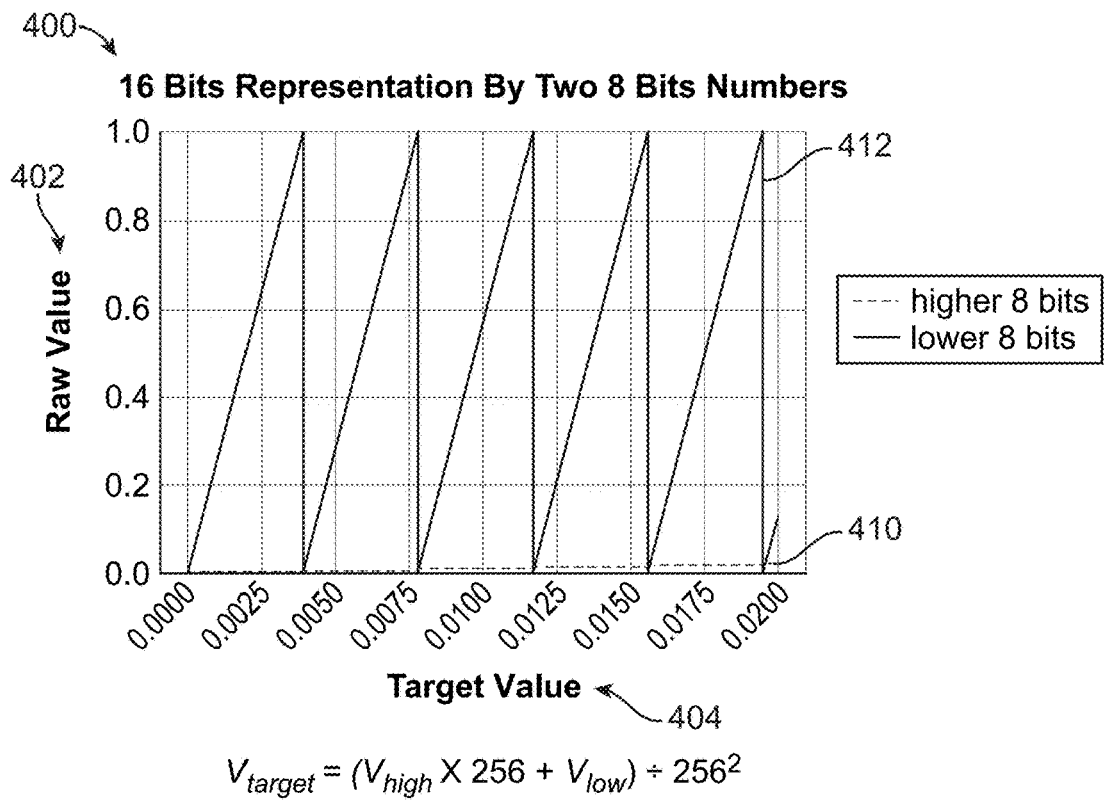
FIG. 4A is a chart illustrating an example representation of a bits number, in accordance with some examples of the present disclosure.

One way to represent a 16-bit number by two 8-bit numbers is to multiply one with 256 and add the result to the other. Such a solution may cause discontinuous behavior for the lower 8-bit number while the target value is around the carry number. FIG. 4A is a chart illustrating an example representation 400 of a 16-bit number. In particular, the representation 400 includes two 8-bit numbers which together represent the 16-bit number. In this example, the representation 400 includes a higher-bit representation 410 and a lower-bit representation 412. The higher-bit representation 410 represents the higher 8 bits and the lower-bit representation 412 represents a lower 8 bits.

The chart in FIG. 4A includes raw values 402 predicted by a deep learning model and target values 404 determined for the deep learning model. In some examples, the target value V can be calculated and/or represented by Equation 2 as follows: $V_{target}=(V_{high}\times 256+V_{low})\div 256^2$. Here, $V_{high}$ represents the maximum target value and $V_{low}$ represents the minimum target value. As shown in FIG. 4A, the lower-bit representation 412 has a discontinuous behavior which can be difficult to model by the deep learning model and difficult to train the model on.

For example, the vector corresponding to the lower-bit representation 412 goes from zero to a maximum value and quickly drops back to zero (and, at certain points, the target value associated with the lower-bit representation 412 can be very close to the target value associated with the higher-bit representation 410), such as when higher bits need a carry number. Moreover, the maximum value associated with the lower-bit representation 412 does not always increase or continue to increase as the target values associated with the lower-bit representation 412 increase. Such discontinuous behavior is difficult to achieve by the deep learning model during inference (and thus difficult to model by a neural network).

Figure 4B:
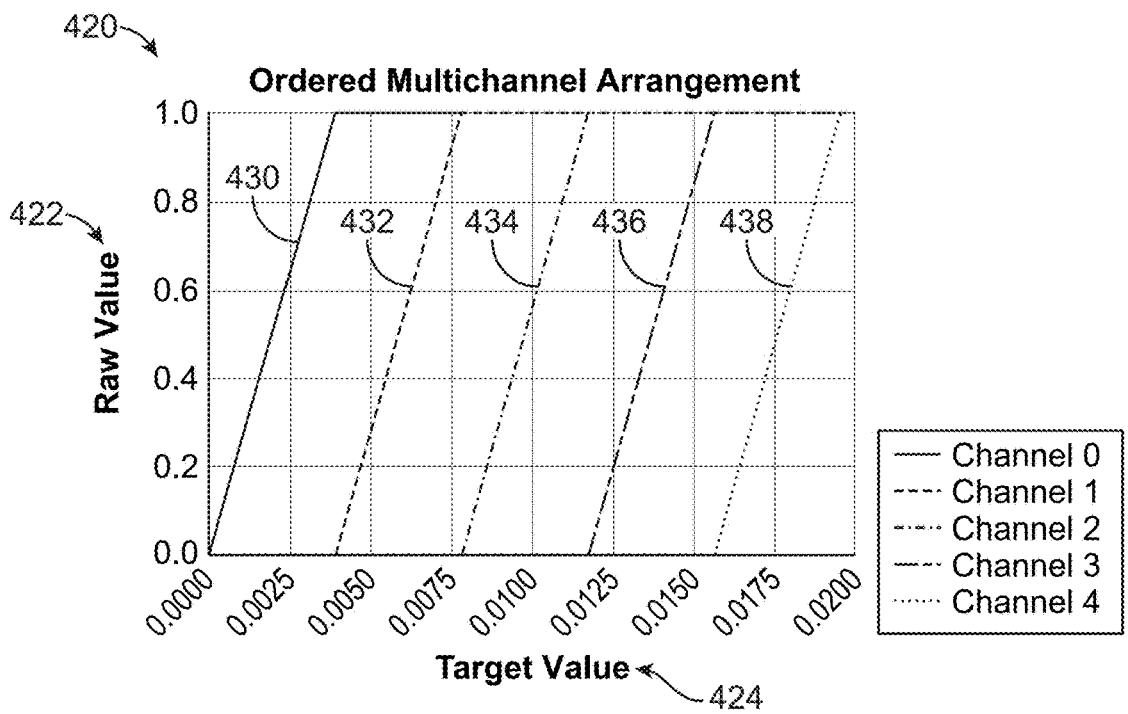
FIG. 4B is a chart illustrating an example of an ordered multi-channel output representation, in accordance with some examples of the present disclosure.

FIG. 4B is a chart illustrating an example of an ordered multi-channel output representation 420. The ordered multi-channel output representation 420 can allow 8-bit numbers to be represented across different channels, and can allow for higher resolution outputs. Moreover, the ordered multi-channel output representation 420 can have a more continuous behavior, which can be easier to achieve by the deep learning model, and simplify the training of the deep learning model. In some examples, the ordered multi-channel output representation 420 can allow the size of the deep learning model to be reduced, and the output speed (e.g., prediction speed) of the deep learning model can be improved.

In this example, the representation 420 includes a multi-channel output. The multi-channel output includes channel outputs 430-438 corresponding to channel 0 through channel 7. The chart in FIG. 4B includes raw values 422 predicted by a deep learning model and target values 424 determined for the deep learning model. In some examples, the target value V can be calculated and/or represented by Equation 2 as follows: $V_{target}=mean\ (V_0+V_1+V_2+V_3+V_4)$. Here, $V_{high}$ represents the maximum target value and $V_{low}$ represents the minimum target value. As shown in FIG. 4B, the value of each channel can go from zero and can be saturated at its maximum value as the target value increases. Moreover, the multi-channel output results in more continuous behavior that is easier to model (and thus easier to achieve by the deep learning model), and can simplify the training of the deep learning model. The multi-channel output can also increase the resolution of the outputs beyond the resolution that would otherwise be achieved by a representation of an 8-bit number with a single channel. For example, the ordered multi-channel output representation 420 can enable higher resolution predictions with an 8-bit quantized deep learning model.

Figures 5A, 5B:
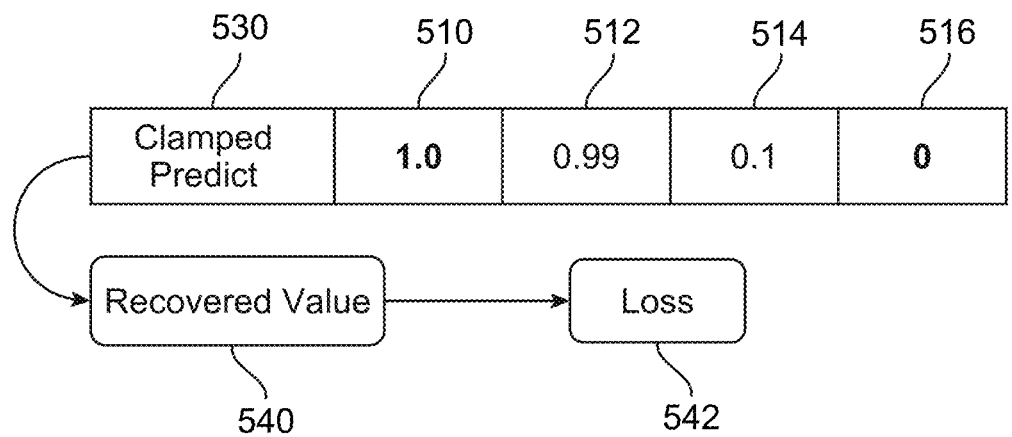
FIG. 5A is a chart illustrating example prediction and ground truth values across multiple channels, in accordance with some examples of the present disclosure.
FIG. 5B is a chart illustrating an example of clamped integration values determined for a major loss function, in accordance with some examples of the present disclosure.

FIG. 5A is a chart illustrating example prediction and ground truth values across multiple channels, which can be used to determine a loss. As shown, the table includes a row 502 of prediction values across channels 510-516, and a row 504 of ground truth values across the channels 510-516. The prediction values in row 502 for channels 510-516 and the ground truth values in row 504 for channels 510-516 can be used to determine a loss 520 used to train the deep learning model.

For example, in some cases, the prediction values in row 502 for channels 510-516 can be compared with the ground truth values in row 504 for channels 510-516. The difference between the prediction values in row 502 for channels 510-516 and the ground truth values in row 504 for channels 510-516 can be used to determine the loss 520. The loss 520 can be used to train the deep learning model for higher precision predictions/outputs. In some examples, the loss 520 can be applied to raw model predictions to improve the predictions and the model.

FIG. 5B is a chart illustrating an example of clamped integration values determined for a major loss function. As shown, the chart includes a row 530 of clamped prediction values for channels 510-516. While the deep learning model used to determine the predictions can be trained through supervised training as previously described, the raw model outputs/predictions may nevertheless go outside of the desired range of [0, 1], which may further reduce the effective resolution representability. The clamped integration can be used to ensure that the prediction values for the multiple channels (e.g., channels 510-516) are within a quantization range, which in this example is [0, 1]. Thus, if a prediction value is outside of the quantization range, then the prediction value can be clamped so it falls within the quantization range.

To illustrate, in the example shown in FIG. 5B, the quantization range is from 0 to 1. However, as shown in FIG. 5A, the prediction values for the channels 510 and 516 are outside of the range of [0, 1]. In particular, the prediction value for channel 510 is 1.1 and thus exceeds the upper limit of the quantization range [0, 1], and the prediction value for channel 516 is −0.1 and thus is below the lower limit of the quantization range [0, 1]. On the other hand, in FIG. 5B, the prediction value for channel 510 has been reduced to 1 (e.g., from 1.1) by the clamped integration and thus is now within the upper limit of the quantization range, and the prediction value for channel 516 has been increased to 0 (e.g., from −0.1) by the clamped integration and thus is now within the lower limit of the quantization range. Therefore, as shown in FIG. 5B, the clamped integration can adjust prediction values that are outside the quantization range so the adjusted prediction values are within the quantization range.

In some examples, the clamped integration can be performed using Equation 1 described above. For example, in some cases, the electronic device 100 can perform the clamped integration for one or more prediction values from a multi-channel prediction as follows:

$$v_{out} = \frac{1}{N}\sum_{1}^{N}\max(\min(v_i, 1), 0),$$

where $v_i$ is the value for channel i, and N is the number of channels. The clamped integration can ensure that the prediction values for channels 510-516 are all within a quantization range, as previously explained.

The clamped integration values in row 530 can be used to recover a single channel output (e.g., recovered value 540). The single channel output can include a single channel representation of the multi-channel prediction values. The single channel output can provide a higher precision and/or resolution than a single channel output derived from an 8-bit quantized deep learning model that does not implement multi-channel outputs as described herein. In some examples, the recovered value 540 can be used to determine a loss 542. In some cases, the loss 542 can include a high-level loss that is based on the recovered value 540.

As previously noted, the clamped integration values derived during the clamped integration can be used to generate the recovered value 540 which, in some examples, can provide a single channel representation of multi-channel predictions. In some examples, the single channel representation (e.g., the recovered value 540) of the multi-channel predictions can be determined based on an average or a mean of the clamped prediction values in row 530. In other examples, the single channel representation (e.g., the recovered value 540) of the multi-channel predictions can be determined based on a different calculation or equation.

Figure 6:
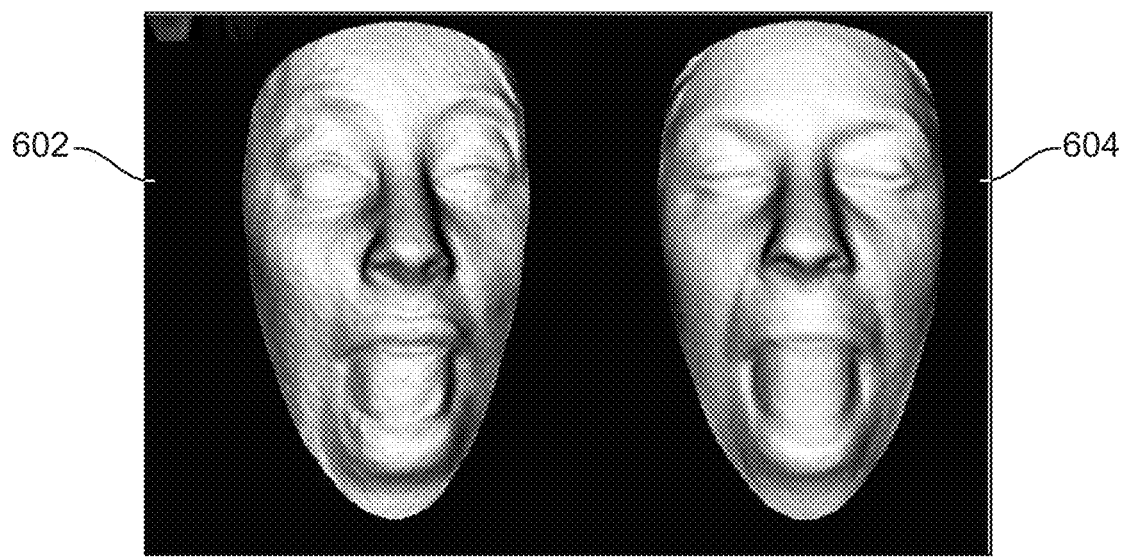
FIG. 6 illustrates example depth estimation outputs generated by a deep learning model, in accordance with some examples of the present disclosure.

FIG. 6 illustrates example depth estimation outputs generated by a deep learning model. In this example, the depth estimation outputs include a three-dimensional (3D) depth map 602 depicting a face, and another 3D depth map 604 depicting the face. The 3D depth map 602 represents a depth estimation output by a deep learning model trained without clamped integration. On the other hand, the 3D depth map 604 represents a depth estimation output by the deep learning model trained with clamped integration.

As shown in FIG. 6, the 3D depth map 604 generated by the deep learning model trained with clamped integration has a higher resolution than the 3D depth map 602 generated by the deep learning model trained without clamped integration. Thus, the clamped integration can significantly improve the output quality of the deep learning model after quantization of the model parameters (e.g., the weights and/or the feature maps).

In some examples, the 3D depth map 602 and the 3D depth map 604 can be generated based on an ordered multi-channel output representation as previously described. In some cases, the process for determining the ordered multi-channel output representation may only involve an additional decompose and integration step for the training stage of the deep learning model. Thus the process for determining the ordered multi-channel output representation can be conducted during training and deployed easily for any task. In some cases, when used for a single image depth reconstruction, the ordered multi-channel output representation process can produce results with higher resolution using an 8-bit quantized deep learning model.

FIG. 7 is a flowchart illustrating an example process 700 for optimizing a deep learning model. At block 702, the process 700 can include generating, based on processing data using a neural network model (e.g., deep learning model 202), a plurality of prediction outputs associated with a plurality of output channels corresponding to a multi-channel prediction target. In some cases, generating the plurality of prediction outputs can include distributing the plurality of prediction outputs across the plurality of output channels. In some examples, the neural network model includes an 8-bit quantized model. In some cases, the neural network model is a CNN or RNN model. In other cases, the neural network model can have any other neural network architecture.

In some examples, the plurality of prediction outputs includes quantized prediction values. In some cases, the plurality of output channels includes 8 channels. In some examples, a quantized prediction output associated with one or more channels from the plurality of output channels represents one or more values within a target range. In some aspects, the process 700 can include a single channel associated with a prediction target into the plurality of output channels.

At block 704, the process 700 can include determining that a prediction output from the plurality of prediction outputs has a value that is outside of a quantization range and one or more remaining prediction outputs from the plurality of prediction outputs have a respective value that is within the quantization range. In some examples, the quantization range can be [0, 1]. For example, in some cases, a maximum value of the quantization range is 1 and a minimum value of the quantization range is 0.

At block 706, the process 700 can include clamping the prediction output based on the quantization range. In some cases, clamping the prediction output based on the quantization range can include modifying a value of the prediction output to fall within the quantization range. For example, clamping the prediction output can include reducing or increasing a value of the prediction output so the value is within the quantization range. In one illustrative example, if the prediction output is 1.1 and the quantization range is [0, 1], then the process 700 can include reducing the prediction output to 1 (e.g., from 1.1). As another illustrative example, if the prediction output is −0.1 and the quantization range is [0, 1], then the process 700 can include increasing the prediction output to 0 (e.g., from −0.1).

At block 708, the process 700 can include generating a single channel output based on the clamped prediction output and the one or more remaining prediction outputs. In some aspects, the clamped prediction output and the one or more remaining prediction outputs can include quantized prediction values. In some cases, the quantized prediction values include a sequence of values between 0 and 1. In some examples, the quantized prediction values represent the multi-channel prediction target. In some aspects, the process 700 can include recovering the multi-channel prediction target using the quantized prediction values. In some examples, the data can include image data. In some aspects, the process 700 can include reconstructing a depth map associated with the image data at least partly based on the single channel output.

In some aspects, the process 700 can include multiplying the multi-channel prediction target by a number of channels in the plurality of output channels. The process 700 can include dividing into binary digits a result of multiplying the multi-channel prediction target by the number of channels. The process 700 can further include distributing the binary digits across at least a portion of the plurality of output channels. In some examples, at least a first binary digit of the binary digits has a value of 1 and at least a portion of the plurality of prediction outputs includes the binary digits. In some aspects, distributing the binary digits across at least a portion of the plurality of output channels can include distributing one or more binary digits having a value of 1 to one or more output channels before distributing one or more additional binary digits having a value of 0 to one or more additional output channels. In some cases, the plurality of prediction outputs can include the one or more binary digits and the one or more additional binary digits. In some cases, the first binary digit is distributed to a first channel from the plurality of output channels.

In some aspects, the process 700 can include generating a multi-channel target distribution value based on a multiplication of the multi-channel prediction target by a number of channels in the plurality of output channels. In some examples, the multi-channel target distribution value can include a floating point number having an integer part and a fractional part. In some aspects, the process 700 can include dividing the integer part of the multi-channel target distribution value into a set of binary digits. The process 700 can include associating the set of binary digits with a set of channels from the plurality of output channels. The process 700 can further include associating a value of the fractional part of the floating point number with a channel from the plurality of output channels. In some cases, the plurality of prediction outputs can include the set of binary digits and the value of the fractional part of the floating point number.

In some aspects, the process 700 can include associating one or more remaining channels from the plurality of output channels with one or more additional binary digits. In some cases, each of the one or more additional binary digits can include a value of 0 and each of the set of binary digits can include a value of 1. In some examples, the plurality of prediction outputs include the one or more additional binary digits.

In some aspects, the process 700 can include comparing the plurality of prediction outputs with a plurality of ground truth predictions associated with the plurality of output channels and determining, based on the comparing of the plurality of prediction outputs with the plurality of ground truth predictions, a loss associated with the neural network model. The process 700 can include training the neural network model based on the loss.

In some aspects, the process 700 can include recovering the multi-channel prediction target based on the single channel output, the clamped prediction output, and/or the one or more remaining prediction outputs. The process 700 can include determining, based on the recovered multi-channel prediction target, a loss associated with the neural network model. The process 700 can further include training the neural network model based on the loss.

In some examples, the processes described herein (e.g., process 200, process 700, and/or any other process described herein) may be performed by a computing device or apparatus. In one example, the process 200 and/or the process 700 can be performed by the electronic device 100 of FIG. 1. In another example, the process 200 and/or the process 700 can be performed by the computing system having the computing device architecture 800 shown in FIG. 8. For instance, a computing device with the computing device architecture 800 shown in FIG. 8 can implement the operations of FIG. 7 and/or the components and/or operations described herein with respect to any of FIGS. 1 through 7.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 200, the process 700, and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 200 and the process 700 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 200, the process 700, and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
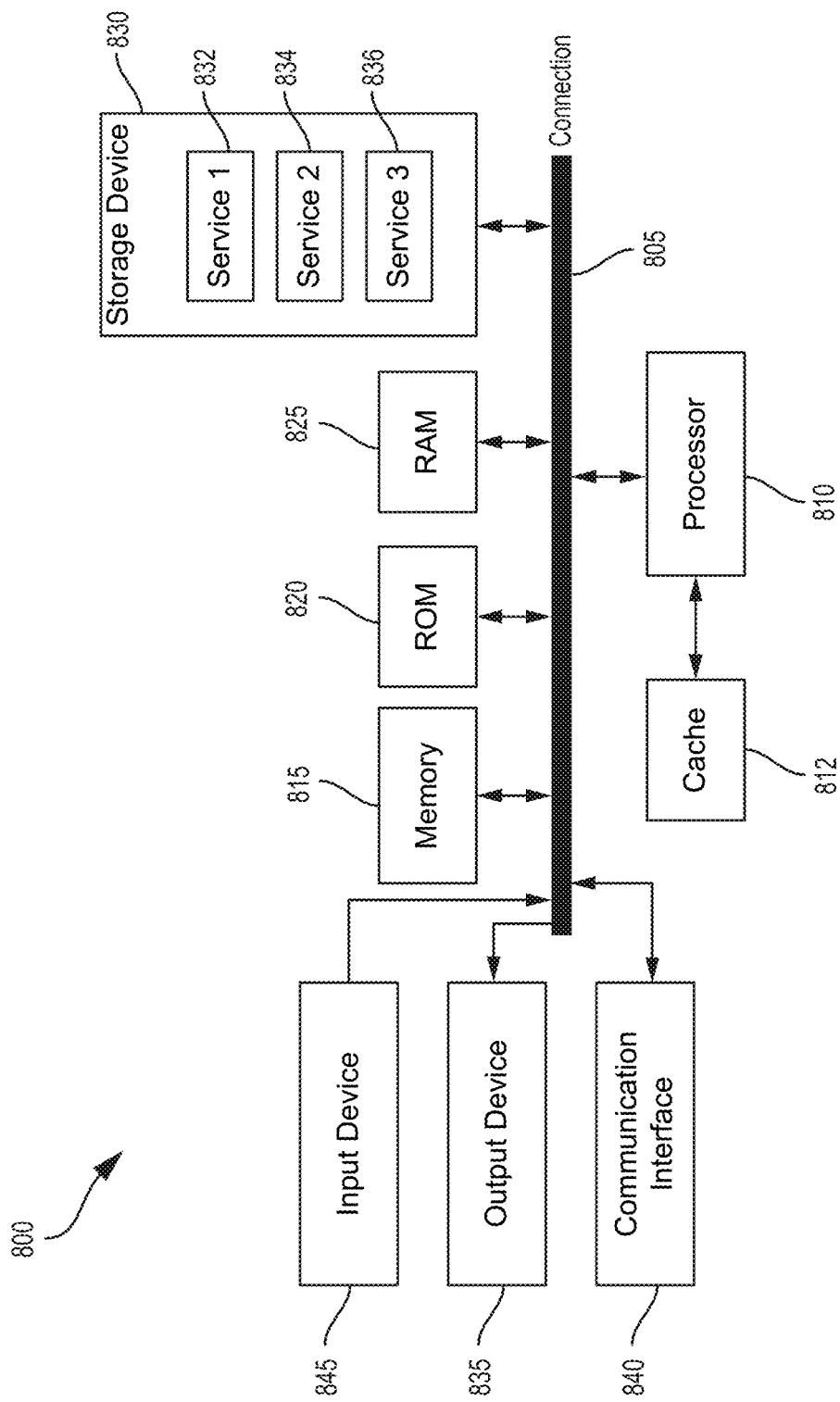
FIG. 8 is a diagram illustrating an example system architecture for implementing certain aspects described herein.

FIG. 8 is a diagram illustrating an example of a system for implementing certain aspects of the present disclosure. In particular, FIG. 8 illustrates an example of computing system 800, which can be for example any computing device making up a computing system, a camera system, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some examples, a hardware service that performs a particular function can include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus for implementing a deep learning model, the apparatus comprising: at least one memory; and at least one processor coupled to the at least one memory, the at least one processor being configured to: generate, based on processing data using a neural network model, a plurality of prediction outputs associated with a plurality of output channels corresponding to a multi-channel prediction target; determine that a prediction output from the plurality of prediction outputs has a value that is outside of a quantization range and one or more remaining prediction outputs from the plurality of prediction outputs have a respective value that is within the quantization range; clamp the prediction output based on the quantization range; and generate a single channel output based on the clamped prediction output and the one or more remaining prediction outputs.

Aspect 2. The apparatus of Aspect 1, wherein the neural network model comprises an 8-bit quantized model.

Aspect 3. The apparatus of any of Aspects 1 to 2, wherein the plurality of prediction outputs comprises quantized prediction values.

Aspect 4. The apparatus of any of Aspects 1 to 3, wherein the at least one processor is configured to: compare the plurality of prediction outputs with a plurality of ground truth predictions associated with the plurality of output channels; determine, based on the comparing of the plurality of prediction outputs with the plurality of ground truth predictions, a loss associated with the neural network model; and train the neural network model based on the loss.

Aspect 5. The apparatus of any of Aspects 1 to 4, wherein the at least one processor is configured to: recover the multi-channel prediction target based on at least one of the single channel output, the clamped prediction output, and the one or more remaining prediction outputs; determine, based on the recovered multi-channel prediction target, a loss associated with the neural network model; and train the neural network model based on the loss.

Aspect 6. The apparatus of any of Aspects 1 to 5, wherein a maximum value of the quantization range is 1 and a minimum value of the quantization range is 0.

Aspect 7. The apparatus of any of Aspects 1 to 6, wherein the clamped prediction output and the one or more remaining prediction outputs comprise quantized prediction values, wherein the quantized prediction values comprise a sequence of values between 0 and 1, and wherein the quantized prediction values represent the multi-channel prediction target.

Aspect 8. The apparatus of Aspect 7, wherein the at least one processor is configured to: recover the multi-channel prediction target using the quantized prediction values.

Aspect 9. The apparatus of any of Aspects 1 to 8, wherein the plurality of output channels comprises 8 channels.

Aspect 10. The apparatus of any of Aspects 1 to 9, wherein a quantized prediction output associated with one or more channels from the plurality of output channels represents one or more values within a target range.

Aspect 11. The apparatus of any of Aspects 1 to 10, wherein, to generate the plurality of prediction outputs, the at least one processor is configured to distribute the plurality of prediction outputs across the plurality of output channels.

Aspect 12. The apparatus of any of Aspects 1 to 11, wherein the at least one processor is configured to: multiply the multi-channel prediction target by a number of channels in the plurality of output channels; divide into binary digits a result of multiplying the multi-channel prediction target by the number of channels, wherein at least a first binary digit of the binary digits comprises a value of 1, and wherein at least a portion of the plurality of prediction outputs comprises the binary digits; and distribute the binary digits across at least a portion of the plurality of output channels, wherein the first binary digit is distributed to a first channel from the plurality of output channels.

Aspect 13. The apparatus of Aspect 12, wherein, to distribute the binary digits across at least a portion of the plurality of output channels, the at least one processor is configured to distribute one or more binary digits having a value of 1 to one or more output channels before distributing one or more additional binary digits having a value of 0 to one or more additional output channels, wherein the plurality of prediction outputs further comprises the one or more binary digits and the one or more additional binary digits.

Aspect 14. The apparatus of any of Aspects 1 to 13, wherein the at least one processor is configured to: generate a multi-channel target distribution value based on a multiplication of the multi-channel prediction target by a number of channels in the plurality of output channels, wherein the multi-channel target distribution value comprises a floating point number having an integer part and a fractional part; divide the integer part of the multi-channel target distribution value into a set of binary digits; associate the set of binary digits with a set of channels from the plurality of output channels; and associate a value of the fractional part of the floating point number with a channel from the plurality of output channels, wherein the plurality of prediction outputs comprises the set of binary digits and the value of the fractional part of the floating point number.

Aspect 15. The apparatus of Aspect 14, wherein the at least one processor is configured to: associate one or more remaining channels from the plurality of output channels with one or more additional binary digits, wherein each of the one or more additional binary digits comprises a value of 0, wherein each of the set of binary digits comprises a value of 1, and wherein the plurality of prediction outputs further comprises the one or more additional binary digits.

Aspect 16. The apparatus of any of Aspects 1 to 15, wherein the data comprises image data, and wherein the at least one processor is configured to reconstruct a depth map associated with the image data at least partly based on the single channel output.

Aspect 17. The apparatus of any of Aspects 1 to 16, wherein, to clamp the prediction output based on the quantization range, the at least one processor is configured to modify a value of the prediction output to fall within the quantization range.

Aspect 18. The apparatus of any of Aspects 1 to 17, wherein the apparatus comprises a mobile device.

Aspect 19. The apparatus of Aspect 18, wherein the mobile device comprises a camera.

Aspect 20. A processor-implemented method of implementing a deep learning model, comprising: generating, based on processing data using a neural network model, a plurality of prediction outputs associated with a plurality of output channels corresponding to a multi-channel prediction target; determining that a prediction output from the plurality of prediction outputs has a value that is outside of a quantization range and one or more remaining prediction outputs from the plurality of prediction outputs have a respective value that is within the quantization range; clamping the prediction output based on the quantization range; and generating a single channel output based on the clamped prediction output and the one or more remaining prediction outputs.

Aspect 21. The processor-implemented method of Aspect 20, wherein the neural network model comprises an 8-bit quantized model.

Aspect 22. The processor-implemented method of any of Aspects 20 to 21, wherein the plurality of prediction outputs comprises quantized prediction values.

Aspect 23. The processor-implemented method of any of Aspects 20 to 22, further comprising: comparing the plurality of prediction outputs with a plurality of ground truth predictions associated with the plurality of output channels; determining, based on the comparing of the plurality of prediction outputs with the plurality of ground truth predictions, a loss associated with the neural network model; and training the neural network model based on the loss.

Aspect 24. The processor-implemented method of any of Aspects 20 to 23, further comprising: recovering the multi-channel prediction target based on at least one of the single channel output, the clamped prediction output, and the one or more remaining prediction outputs; determining, based on the recovered multi-channel prediction target, a loss associated with the neural network model; and training the neural network model based on the loss.

Aspect 25. The processor-implemented method of any of Aspects 20 to 24, wherein a maximum value of the quantization range is 1 and a minimum value of the quantization range is 0.

Aspect 26. The processor-implemented method of any of Aspects 20 to 25, wherein the clamped prediction output and the one or more remaining prediction outputs comprise quantized prediction values, wherein the quantized prediction values comprise a sequence of values between 0 and 1, and wherein the quantized prediction values represent the multi-channel prediction target.

Aspect 27. The processor-implemented method of Aspect 26, further comprising: recovering the multi-channel prediction target using the quantized prediction values.

Aspect 28. The processor-implemented method of any of Aspects 20 to 27, wherein the plurality of output channels comprises 8 channels.

Aspect 29. The processor-implemented method of any of Aspects 20 to 28, wherein a quantized prediction output associated with one or more channels from the plurality of output channels represents one or more values within a target range.

Aspect 30. The processor-implemented method of any of Aspects 20 to 29, wherein generating the plurality of prediction outputs comprises distributing the plurality of prediction outputs across the plurality of output channels.

Aspect 31. The processor-implemented method of any of Aspects 20 to 30, further comprising: multiplying the multi-channel prediction target by a number of channels in the plurality of output channels; dividing into binary digits a result of multiplying the multi-channel prediction target by the number of channels, wherein at least a first binary digit of the binary digits comprises a value of 1, and wherein at least a portion of the plurality of prediction outputs comprises the binary digits; and distributing the binary digits across at least a portion of the plurality of output channels, wherein the first binary digit is distributed to a first channel from the plurality of output channels.

Aspect 32. The processor-implemented method of Aspect 31, wherein distributing the binary digits across at least a portion of the plurality of output channels comprises distributing one or more binary digits having a value of 1 to one or more output channels before distributing one or more additional binary digits having a value of 0 to one or more additional output channels, wherein the plurality of prediction outputs further comprises the one or more binary digits and the one or more additional binary digits.

Aspect 33. The processor-implemented method of any of Aspects 20 to 32, further comprising: generating a multi-channel target distribution value based on a multiplication of the multi-channel prediction target by a number of channels in the plurality of output channels, wherein the multi-channel target distribution value comprises a floating point number having an integer part and a fractional part; dividing the integer part of the multi-channel target distribution value into a set of binary digits; associating the set of binary digits with a set of channels from the plurality of output channels; and associating a value of the fractional part of the floating point number with a channel from the plurality of output channels, wherein the plurality of prediction outputs comprises the set of binary digits and the value of the fractional part of the floating point number.

Aspect 34. The processor-implemented method of Aspect 33, further comprising: associating one or more remaining channels from the plurality of output channels with one or more additional binary digits, wherein each of the one or more additional binary digits comprises a value of 0, wherein each of the set of binary digits comprises a value of 1, and wherein the plurality of prediction outputs further comprises the one or more additional binary digits.

Aspect 35. The processor-implemented method of any of Aspects 20 to 34, wherein the data comprises image data, and further comprising reconstructing a depth map associated with the image data at least partly based on the single channel output.

Aspect 36. A non-transitory computer-readable medium having stored thereon instructions which, when executed by one or more processors, cause the one or more processors to perform operations according to any of Aspects 19 to 35.

Aspect 37. An apparatus comprising means for performing operations according to any of Aspects 19 to 35.

What is claimed is:

1. An apparatus for implementing a deep learning model, the apparatus comprising:
   at least one memory; and
   at least one processor coupled to the at least one memory, the at least one processor being configured to:
      generate, based on processing data using a neural network model, a plurality of prediction outputs associated with a plurality of output channels corresponding to a multi-channel prediction target;
      determine that a prediction output from the plurality of prediction outputs has a value that is outside of a quantization range and one or more remaining prediction outputs from the plurality of prediction outputs have a respective value that is within the quantization range;
      clamp the prediction output based on the quantization range;
      generate a single channel output based on the clamped prediction output and the one or more remaining prediction outputs;
      multiply the multi-channel prediction target by a number of channels in the plurality of output channels;
      divide into binary digits a result of multiplying the multi-channel prediction target by the number of channels, wherein at least a first binary digit of the binary digits comprises a value of 1, and wherein at least a portion of the plurality of prediction outputs comprises the binary digits; and
      distribute the binary digits across at least a portion of the plurality of output channels, wherein the first binary digit is distributed to a first channel from the plurality of output channels.

2. The apparatus of claim 1, wherein the neural network model comprises an 8-bit quantized model.

3. The apparatus of claim 1, wherein the plurality of prediction outputs comprises quantized prediction values.

4. The apparatus of claim 1, wherein the at least one processor is configured to:
   compare the plurality of prediction outputs with a plurality of ground truth predictions associated with the plurality of output channels;
   determine, based on the comparing of the plurality of prediction outputs with the plurality of ground truth predictions, a loss associated with the neural network model; and
   train the neural network model based on the loss.

5. The apparatus of claim 1, wherein the at least one processor is configured to:
   recover the multi-channel prediction target based on at least one of the single channel output, the clamped prediction output, and the one or more remaining prediction outputs;
   determine, based on the recovered multi-channel prediction target, a loss associated with the neural network model; and
   train the neural network model based on the loss.

6. The apparatus of claim 1, wherein a maximum value of the quantization range is 1 and a minimum value of the quantization range is 0.

7. The apparatus of claim 1, wherein the clamped prediction output and the one or more remaining prediction outputs comprise quantized prediction values, wherein the quantized prediction values comprise a sequence of values between 0 and 1, and wherein the quantized prediction values represent the multi-channel prediction target.

8. The apparatus of claim 7, wherein the at least one processor is configured to:
   recover the multi-channel prediction target using the quantized prediction values.

9. The apparatus of claim 1, wherein the plurality of output channels comprises 8 channels.

10. The apparatus of claim 1, wherein a quantized prediction output associated with one or more channels from the plurality of output channels represents one or more values within a target range.

11. The apparatus of claim 1, wherein, to generate the plurality of prediction outputs, the at least one processor is configured to distribute the plurality of prediction outputs across the plurality of output channels.

12. The apparatus of claim 1, wherein, to distribute the binary digits across at least a portion of the plurality of output channels, the at least one processor is configured to distribute one or more binary digits having a value of 1 to one or more output channels before distributing one or more additional binary digits having a value of 0 to one or more additional output channels, wherein the plurality of prediction outputs further comprises the one or more binary digits and the one or more additional binary digits.

13. The apparatus of claim 1, wherein the at least one processor is configured to:
   generate a multi-channel target distribution value based on a multiplication of the multi-channel prediction target by a number of channels in the plurality of output channels, wherein the multi-channel target distribution value comprises a floating point number having an integer part and a fractional part;
   divide the integer part of the multi-channel target distribution value into a set of binary digits;
   associate the set of binary digits with a set of channels from the plurality of output channels; and
   associate a value of the fractional part of the floating point number with a channel from the plurality of output channels, wherein the plurality of prediction outputs comprises the set of binary digits and the value of the fractional part of the floating point number.

14. The apparatus of claim 13, wherein the at least one processor is configured to:

associate one or more remaining channels from the plurality of output channels with one or more additional binary digits, wherein each of the one or more additional binary digits comprises a value of 0, wherein each of the set of binary digits comprises a value of 1, and wherein the plurality of prediction outputs further comprises the one or more additional binary digits.

15. The apparatus of claim 1, wherein the data comprises image data, and wherein the at least one processor is configured to reconstruct a depth map associated with the image data at least partly based on the single channel output.

16. The apparatus of claim 1, wherein, to clamp the prediction output based on the quantization range, the at least one processor is configured to modify a value of the prediction output to fall within the quantization range.

17. The apparatus of claim 1, wherein the apparatus comprises a mobile device.

18. The apparatus of claim 17, wherein the mobile device comprises a camera.

19. A processor-implemented method of implementing a deep learning model, comprising:
    generating, based on processing data using a neural network model, a plurality of prediction outputs associated with a plurality of output channels corresponding to a multi-channel prediction target;
    determining that a prediction output from the plurality of prediction outputs has a value that is outside of a quantization range and one or more remaining prediction outputs from the plurality of prediction outputs have a respective value that is within the quantization range;
    clamping the prediction output based on the quantization range; generating a single channel output based on the clamped prediction output and the one or more remaining prediction outputs;
    multiplying the multi-channel prediction target by a number of channels in the plurality of output channels;
    dividing into binary digits a result of multiplying the multi-channel prediction target by the number of channels, wherein at least a first binary digit of the binary digits comprises a value of 1, and wherein at least a portion of the plurality of prediction outputs comprises the binary digits; and
    distributing the binary digits across at least a portion of the plurality of output channels, wherein the first binary digit is distributed to a first channel from the plurality of output channels.

20. The processor-implemented method of claim 19, wherein the neural network model comprises an 8-bit quantized model, and wherein the plurality of output channels comprises 8 channels.

21. The processor-implemented method of claim 19, wherein the plurality of prediction outputs comprises quantized prediction values.

22. The processor-implemented method of claim 19, further comprising:
    comparing the plurality of prediction outputs with a plurality of ground truth predictions associated with the plurality of output channels;
    determining, based on the comparing of the plurality of prediction outputs with the plurality of ground truth predictions, a loss associated with the neural network model; and
    training the neural network model based on the loss.

23. The processor-implemented method of claim 19, further comprising:
    recovering the multi-channel prediction target based on at least one of the single channel output, the clamped prediction output, and the one or more remaining prediction outputs;
    determining, based on the recovered multi-channel prediction target, a loss associated with the neural network model; and
    training the neural network model based on the loss.

24. The processor-implemented method of claim 19, wherein a maximum value of the quantization range is 1 and a minimum value of the quantization range is 0.

25. The processor-implemented method of claim 19, wherein the clamped prediction output and the one or more remaining prediction outputs comprise quantized prediction values, wherein the quantized prediction values comprise a sequence of values between 0 and 1, and wherein the quantized prediction values represent the multi-channel prediction target, and further comprising:
    recovering the multi-channel prediction target using the quantized prediction values.

26. The processor-implemented method of claim 19, wherein a quantized prediction output associated with one or more channels from the plurality of output channels represents one or more values within a target range.

27. The processor-implemented method of claim 19, wherein generating the plurality of prediction outputs comprises distributing the plurality of prediction outputs across the plurality of output channels.

28. The processor-implemented method of claim 19, wherein clamping the prediction output based on the quantization range comprises modifying a value of the prediction output to fall within the quantization range.

* * * * *